Oct. 25, 1966  W. B. SEIDEL  3,280,512
GRINDING MACHINE FEED MECHANISM
Filed Feb. 20, 1964  5 Sheets-Sheet 1

INVENTOR.
WILLIAM B. SEIDEL
BY
Howard H. Keiser
John F. Verhoeven
ATTORNEYS

Oct. 25, 1966 W. B. SEIDEL 3,280,512
GRINDING MACHINE FEED MECHANISM
Filed Feb. 20, 1964 5 Sheets-Sheet 2
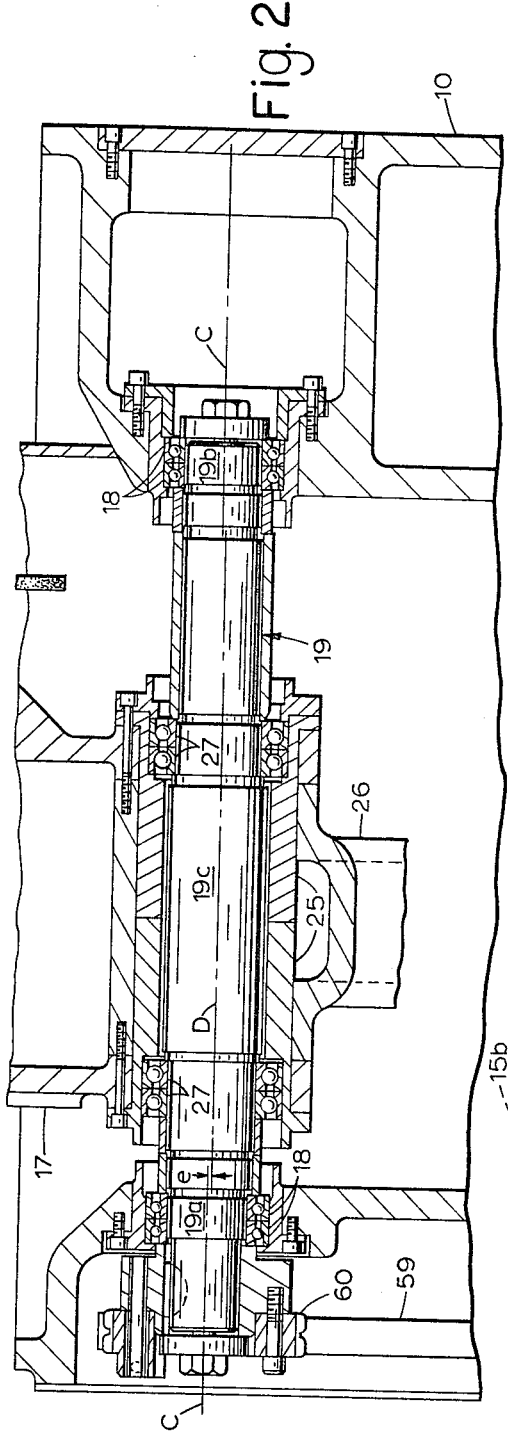
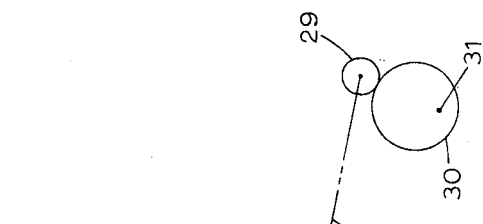
Fig. 6
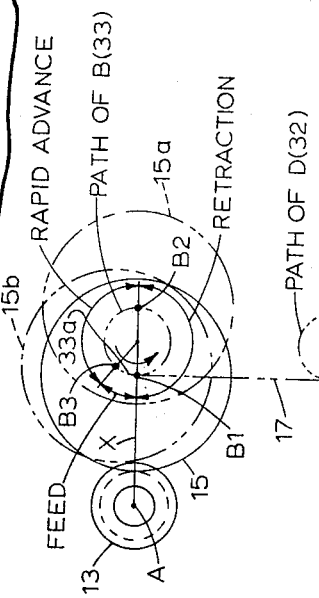
Fig. 5
Fig. 2

Oct. 25, 1966 W. B. SEIDEL 3,280,512
GRINDING MACHINE FEED MECHANISM
Filed Feb. 20, 1964 5 Sheets-Sheet 4

Oct. 25, 1966 W. B. SEIDEL 3,280,512
GRINDING MACHINE FEED MECHANISM
Filed Feb. 20, 1964 5 Sheets-Sheet 5

United States Patent Office 3,280,512
Patented Oct. 25, 1966

3,280,512
GRINDING MACHINE FEED MECHANISM
William B. Seidel, Cincinnati, Ohio, assignor to The Cincinnati Milling Machine Co., Cincinnati, Ohio, a corporation of Ohio
Filed Feb. 20, 1964, Ser. No. 346,179
4 Claims. (Cl. 51—165)

The present invention relates to feed mechanism for a grinding machine particularly suitable for rapid successive grinds on small workpieces.

The grinding of small workpieces (such as races for minature bearings), from which only a small amount of material is to be removed, requires particularly precise relative feed movement between the workpiece and the grinding wheel if sufficiently precise miniature workpieces are to be produced. In addition to precise feed movement between the grinding wheel and the workpiece for grinding, precise adjusting movement therebetween is necessary as, for example, to grind miniature workpieces of different diameter.

Small, precise, movement of a slide (such as a wheelhead for a grinding wheel) on ways is difficult in a machine tool because of stick-slip between the slide and the ways. This phenomenon, resulting from the difference in magnitude between the resistance offered to movement of the slide by static friction and that offered by sliding friction, causes jerky movement of the slide and makes accurate positioning or stopping of the slide difficult. Any inaccuracy in the extreme advanced position of the wheelhead (and hence the advanced position of the grinding wheel) with respect to the workpiece due to a stick-slip produces a corresponding inaccuracy in the diameter to which the workpiece is ground.

In the present invention, mechanism is provided to produce precise, accurate, feed movement in a grinding machine and, in the preferred form of the invention disclosed herein, mechanism is provided to effect small precise feed cycles in rapid succession, which mechanism can be adjusted with precision to accommodate workpieces of different size. In brief, in the preferred form of the invention, a grinding wheel is mounted in a wheelhead which is not mounted on flat ways but, instead, is mounted on an eccentric shaft. As the eccentric shaft rotates, the wheelhead orbits in a circle, for movement, without stick-slip, towards and from a workpiece support. The grinding wheel is mounted on a spindle spaced from the eccentric shaft so that the grinding wheel orbits in a path determined by the angular position, or attitude, of the wheelhead. A separate workpiece is ground on each orbit of the grinding wheel. To adjust the mechanism for grinding smaller or larger workpieces, the attitude of the wheelhead on the eccentric shaft is modified, an adjustment which can be effected with precision without stick-slip.

In the preferred form of the invention, the eccentric shaft is rotated continuously to continuously orbit the grinding wheel. Each orbit of the grinding wheel, which is produced by 360 degrees of rotation of the eccentric shaft, includes movement of the grinding wheel toward the workpiece support during 180 degrees of shaft rotation and movement of the grinding wheel away from the workpiece support during the remaining 180 degrees of shaft rotation. The movement of the grinding wheel toward the workpiece support includes both approach of the wheel to the work, and feed movement of the grinding wheel into the work. A drive system is provided which can rotate the eccentric shaft at different speeds during each rotation, so that movement of the grinding wheel with respect to the workpiece can be effected at different speeds in different parts of each grind cycle to grind the maximum quantity of workpieces.

It is therefore one object of the present invention to provide a feed mechanism for a grinding machine to effect accurate, precise relative movement between a wheelhead and a workpiece support. It is another object of the present invention to provide a feed mechanism in which relative movement between a grinding wheel and a workpiece for grinding is unaffected by stick-slip. It is yet another object of the present invention to provide a feed mechanism in which both feed and adjusting movement between the grinding wheel and the workpiece is effected without stick-slip. It is still another object of the present invention to provide a feed mechanism for grinding small workpieces in rapid succession.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 2 is a view taken on the line 2—2 of FIG. 1;

FIG. 5 is a schematic diagram showing the orbital movement of the wheelhead and the grinding wheel;

FIG. 6 is a schematic diagram similar to FIG. 5 except with the attitude of the wheelhead modified for workpieces of different size;

Figure 1:
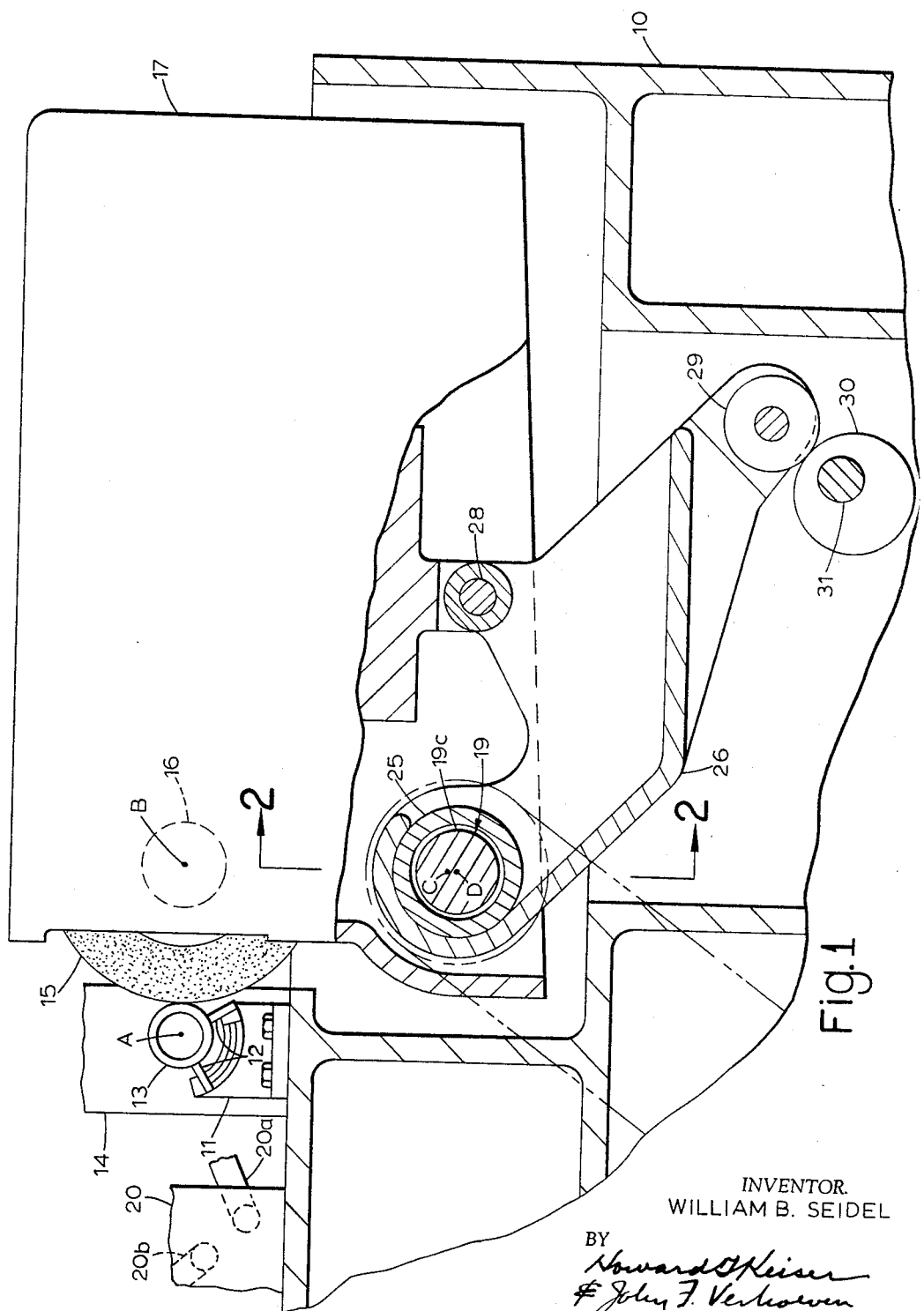
FIG. 1 is a fragmentary side view, partly in cross-section, of a grinding machine constructed in accordance with the present invention.

There is shown in FIG. 1 a portion of the base 10 of a grinding machine. A workpiece support 11 is mounted on the base 10 and has a pair of shoes 12 thereon which support an annular workpiece 13 in centered relation to a fixed axis A. A headstock 14 mounted on the base 10 has a rotating annular face plate which engages one end of the workpiece 13 to rotate the workpiece in the shoes 12 for grinding. A workpiece loader 20, which may be similar to the loader shown in U.S. Patent 2,912,798, is mounted on the base 10 and has two arms 20a and 20b. When the loader is actuated, the two arms swing simultaneously, the arm 20a taking a finished workpiece off the shoes to a discharge chute (not shown) and the arm 20b taking an unoperated workpiece from a loading chute (not shown) to the shoes. Thereafter the two arms return empty to their starting positions.

A grinding wheel 15 is mounted on spindle 16 which is journaled in a wheelhead 71. The spindle 16, which has a central axis B, is driven by a motor (not shown) mounted in the wheelhead. As shown in FIG. 2, two pairs of ball bearings 18, mounted in opposite sides of base 10, receive, respectively, the end portions 19a, 19b of a wheelhead support shaft 19 therein on an axis C. The central portion 19c of shaft 19 is eccentric with respect to the end portions 19a and 19b (that is, the central axis D of central portion 19c is offset a distance e from the central axis C of the end portions 19a, 19b).

The wheelhead 17 has a split sleeve 25 secured therein and has a lever 26 connected thereto which encircles the sleeve 25. The sleeve 25 is carried by two spaced pairs of ball bearings 27 which are mounted on the central eccentric portion 19c of shaft 19. The lever 26, in addition to being connected to the wheelhead at the support shaft 19, is connected thereto by pin 28 behind the shaft 19, as shown in FIG. 1. The lever 26 extends rearwardly and downwardly from shaft 19 and has a roller 29 thereon spaced from both shaft 19 and pin 28. The roller 29 rests on a disc 30 which is mounted eccentrically on a shaft 31. The shaft 31, which is journaled in the base 10, extends outside the base 10 and is angularly adjustable by the operator.

As shown in FIGS. 1 and 5, when shaft 19 is rotated, the central axis D of the eccentric portion 19c orbits in a predetermined circular path 32 about the axis C which remains fixed with respect to base 10. Thus, the wheelhead 17, which is partly supported by the eccentric portion 19c of support shaft 19, orbits with portion 19c where it is connected to that shaft portion. Since lever 26 is connected to wheelhead 17 at two spaced points, the lever 26 cannot pivot with respect to wheelhead 17 and may be considered a rigid extension of the wheelhead. Thus the wheelhead 17 is partly supported by disc 30. With disc 30 and shaft 31 stationary, and shaft 19 rotating, the wheelhead is supported in part by an orbiting member and supported in part by a stationary member. This produces a slight rocking movement of the wheelhead as it orbits. Even though, as a result of this rocking movement, the angular position of the wheelhead with respect to axis C, or, in other words, the attitude of the wheelhead, changes during each rotation of shaft 19, this change of attitude of the wheelhead is not significant because the attitude of the wheelhead at any particular angular position of shaft 19 is the same on each rotation of shaft 19. By way of example, when the shaft 19 is in the angular position shown in FIG. 5 with axis D in its most advanced position (to the left as viewed in FIG. 5) and with axis B in its most advanced position at B1, the wheelhead will be in a particular angular position with respect to axis C and the grinding wheel will move to a particular advanced position relative to axis A (as shown in solid lines in FIG. 5). Although the attitude of the wheelhead changes during each rotation of shaft 19, workpieces will be ground to the same predetermined size on successive rotations of shaft 19 if the grinding wheel remains the same size and if the attitude of the wheelhead with respect to axis C is the same when the grinding wheel is at its extreme inner position toward axis A.

If the grinding wheel diminishes in size due to wear, or if workpieces of different size as, for example, the smaller workpiece shown at 13' in FIG. 6 are to be ground, the attitude of the wheelhead when the grinding wheel is in its most advanced position must be changed. This is accomplished by rotation of shaft 31, to elevate the outer end of lever 26 (as shown in FIG. 6), thereby elevating the rear end of wheelhead 17. This shifts the axis B of spindle 16 closer to the central axis A of a workpiece supported on shoes 12 so that when shaft 19 is rotated, the spindle axis B orbits in a new path 33' closer to the axis A.

At any given angular setting of disc 30, the grinding wheel spindle (and hence central axis B thereof) travels through 360 degrees on each rotation of shaft 19. On each 360 degree of travel of axis B on the circular path 33 (or 33'), 180 degrees of that travel (from position B2 to position B1) produces advance of the grinding wheel toward the workpiece 13, and 180 degrees of that travel (from position B1 to position B2) produces retraction of the grinding wheel away from the workpiece 13. Of the advance of axis B on path 33 (or 33'), part of that movement (from B2 to B3) constitutes approach movement before contact of the grinding wheel with the workpiece, and the rest of the movement (from B3 to B1) constitutes feed movement with the grinding wheel in abrading contact with the workpiece. It will be noted in FIG. 5 that all movement of axis B is counterclockwise. Dotted line 15a indicates the position of the fully retracted grinding wheel (when axis B is at B2) and dotted line 15b indicates the position of the grinding wheel as it first engages the workpiece (when axis B is at B3).

The workpiece is completely ground as axis B moves from position B3 to position B1. During the rest of the orbit of axis B, the finished workpiece 13 is removed from shoes 12 by arm 20a of loader 20 and a new workpiece 13 is placed thereon by arm 20b. The new workpiece 13 is ground on the next rotation of shaft 19.

For maximum output of the machine, it is desirable that each grind cycle (that is: load, grind, unload) be effected as quickly as possible. Each rotation of the shaft 19 produces a grind cycle, in which some fraction of the rotation is consumed in grinding and some fraction of the rotation is consumed in loading and unloading. The maximum speed of shaft 19 is determined, during the grind portion of the cycle, by the time required to grind the workpiece; the maximum speed of shaft 19 is determined, during the loading and unloading portion of the cycle, by the speed of the loading and unloading mechanism 20. Normally, the loading and unloading mechanism is sufficiently rapid to permit a more rapid rotation of shaft 19 during the loading and unloading portion of the cycle than the rotation thereof during the grinding portion of the cycle. In order to permit maximum speed of rotation of shaft 19 during all portions of the cycle, a drive has been provided for shaft 19 in which the speed of the shaft is automatically changed during the cycle.

A constant speed electric motor 40 mounted in base 10 rotates shaft 41 which is connected, through gears 42, 43, 44, and 45, to shaft 46. Shaft 46, which is driven at a constant speed, has a gear 47 thereon engaged with gear 48 of electric clutch 49. The clutch 49 is mounted on shaft 50 and connects shaft 50 to gear 48 for rotation therewith when the clutch 49 is energized, the gear 48 and shaft 50 being relatively rotatable when the clutch 49 is deenergized. Shaft 46 is connected to shaft 51 through the change gears 52, 53 and drives the shaft 51 at a speed determined by the particular pair of change gears selected. The speed of shaft 51 may be greater or less than the speed of shaft 46. The shaft 51 has a gear 54 mounted thereon which is engaged with an idler gear 55. Gear 55, in turn, is engaged with gear 56 of electric clutch 57. Electric clutch 57 is mounted on shaft 50 and connects shaft 50 to gear 56 for rotation therewith when the clutch 57 is energized, the gear 56 and shaft 50 being relatively rotatable when the clutch 57 is deenergized.

Thus it will be seen that shaft 50 is driven by motor 40 through a transmission including two electric clutches 49, 57 which have, respectively, two continuously rotating electric clutch gears 48 and 56 on shaft 50, the clutch gear 48 rotating at some predetermined speed determined by the constant predetermined speed of shaft 46, and the clutch gear 56 rotating at some selected constant speed determined by the speed of shaft 46 and the selected change gears 52, 53. Only one clutch is energized at a time, and when one of the clutches 49, 57 is energized, the shaft 50 rotates at the speed at which the gear 48 or 56 connected to the energized clutch is rotated. Shaft 50 has a sprocket 58 connected thereto which is connected, through chain 59, with a sprocket 60 on one end of shaft 19.

Figure 7:
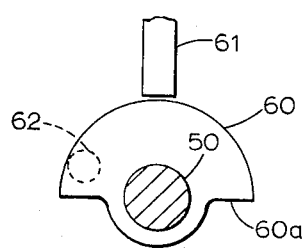
FIG. 7 is a view taken on the line 7—7 of FIG. 4.

The shaft 50, which rotates clockwise as viewed in FIG. 7, has a semi-circular metal disc 60 thereon which rotates with the shaft. An electrical proximity probe 61 is fixed in the base 10 adjacent the path of disc 60. A second electrical proximity probe 62, similar to probe 61, is mounted on a hub 63 adjacent the path of disc 60 and can be angularly adjusted with respect to the disc 60 by rotation of hub handle 64. The probes 61 and 62, in cooperation with disc 60, define signaling means which, by operation of switches, produce signals in coordination with rotation of the support shaft for selectively energizing one or the other of the clutches 49, 57.

Figure 3:
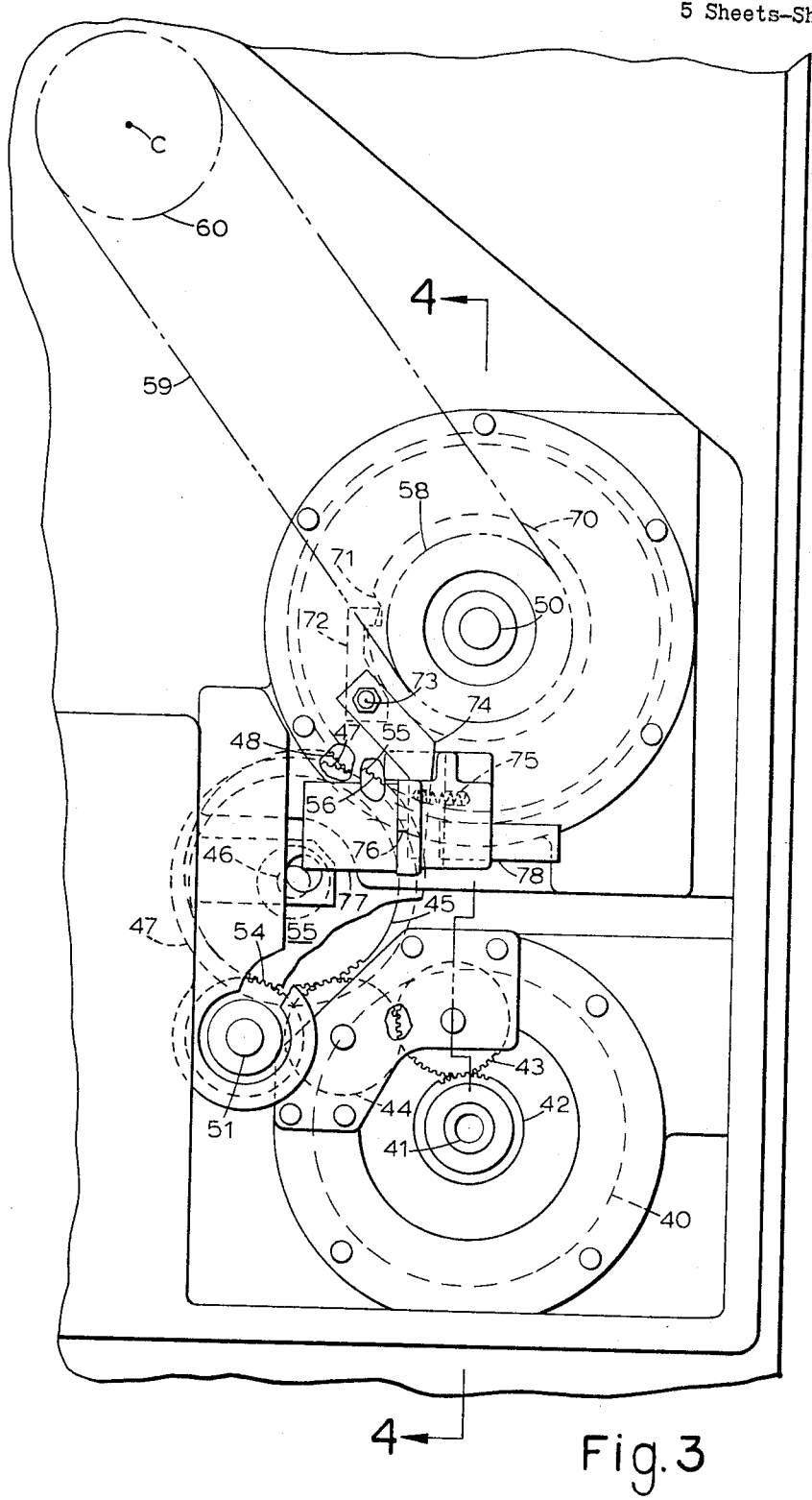
FIG. 3 is a fragmentary view of the side of the grinding machine opposite the side shown in FIG. 1.
Figure 4:
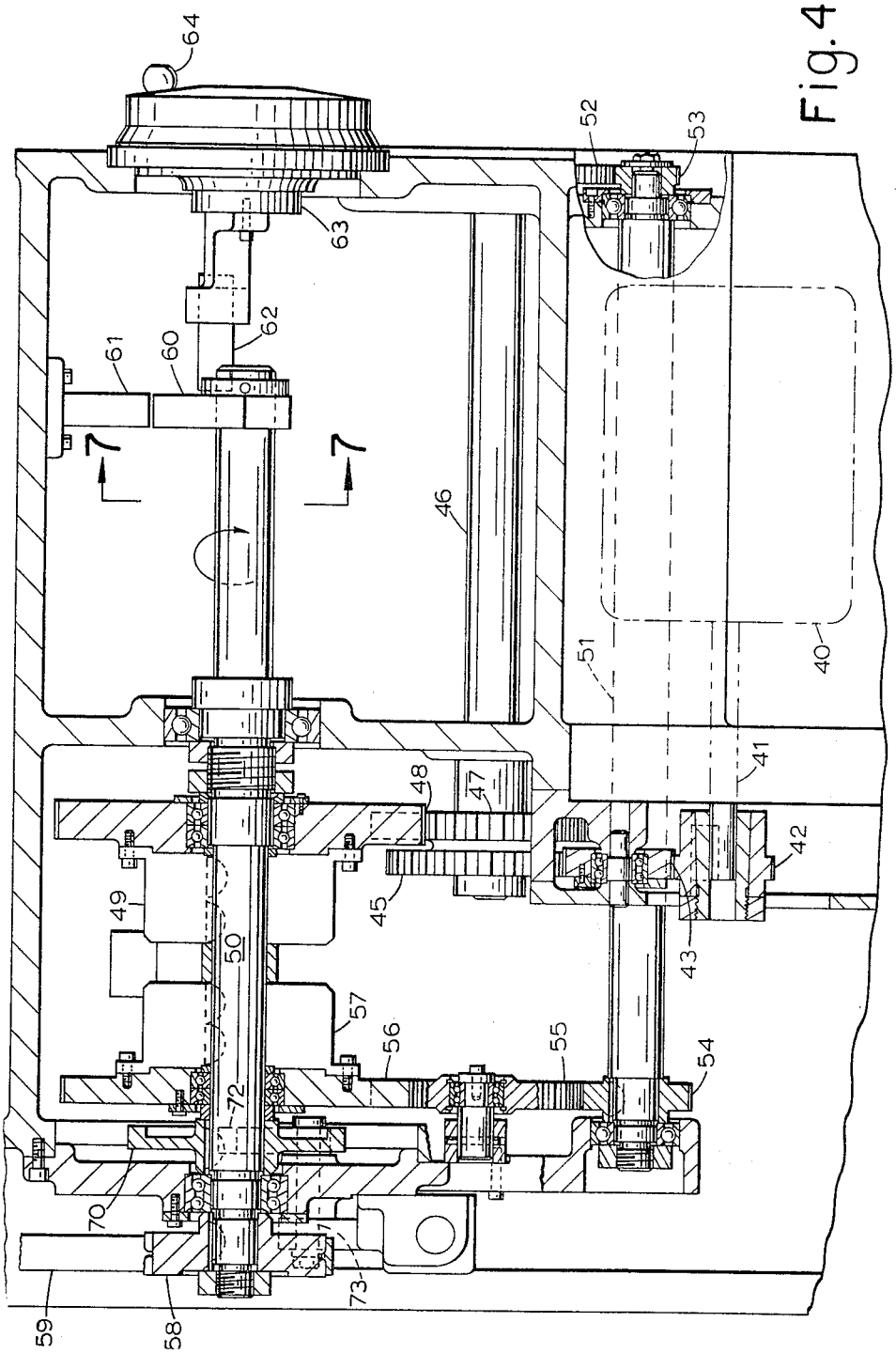
FIG. 4 is a view taken on the line 4—4 of FIG. 3.
Figure 8:
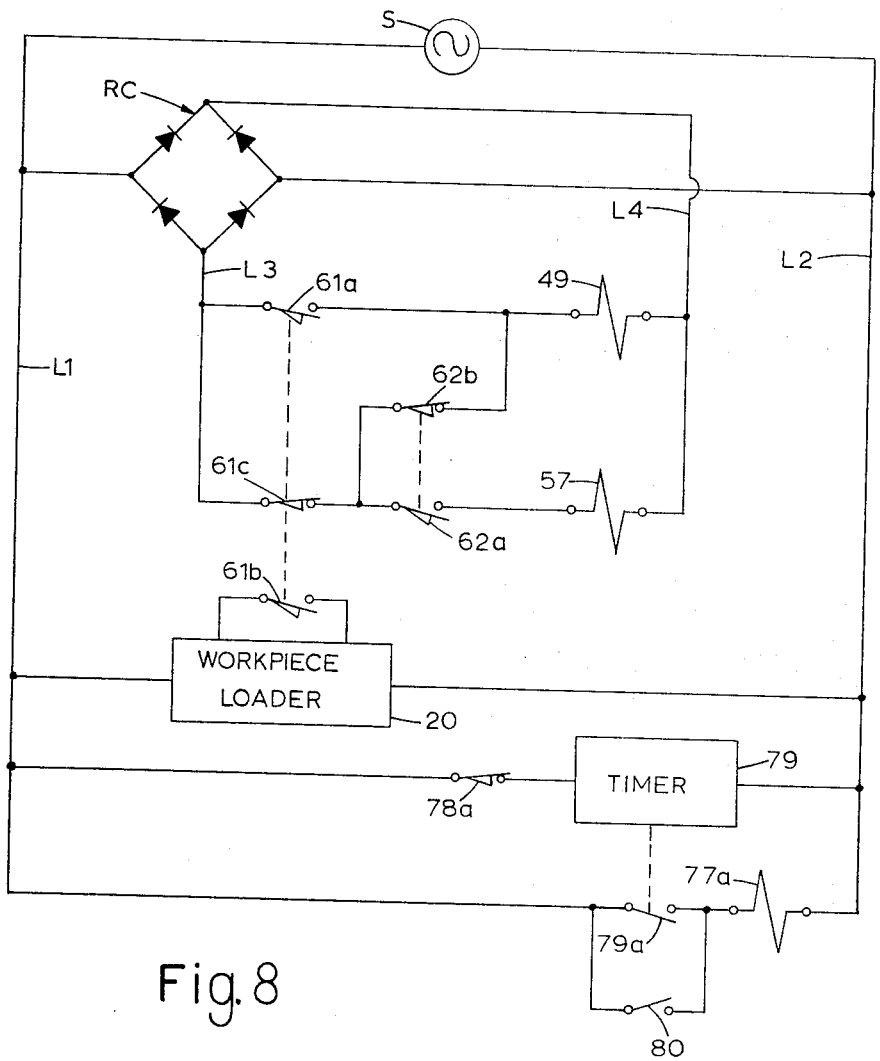
FIG. 8 is an electrical diagram of the machine described herein.

The shaft 50 also has a plate 70 secured thereto which has a notch 71 therein, as shown in FIGS. 3 and 4. A pawl 72 is secured to one end of a pin 73 which is rotatably received in base 10. A link 74 secured to the other end of pin 73 is urged by spring 75 against the plunger 76 of solenoid 77. When solenoid 77 is energized, plunger 76 is extended against the bias exerted by spring 75 to release pawl 72 from notch 71. As the plunger 76 extends, the links 74 moves into operating proximity to electrical proximity probe 78.

The sprockets 58 and 60 through which shafts 19 and 50 are connected have the same number of teeth so that one revolution of shaft 50 produces one revolution of shaft 19. As the central axis D of the eccentric portion 19c of shaft 19 reaches the position shown in FIG. 5 and axis B is in the position B1 where the grinding wheel 15 is in its extreme advanced position, the pawl 72 drops into notch 71 and link 74 moves away from probe 78. The pawl 72 in notch 71 locks shaft 50 against rotation. At this time, clutch 57 is energized but will slip as long as pawl 72 is engaged with notch 71. At this time the disc 60 is slightly more than 90 degrees counterclockwise from the position shown in FIG. 7.

The movement of link 74 from probe 78, releases the probe and closes the normally closed contacts 78a thereof. This energizes a timer 79 and initiates a timed interval at the end of which switch contacts 79a of timer 79 close to energize the coil 77a of solenoid 77. Energization of coil 77a extends plunger 76 to shift pawl 72 from notch 71 for release of shaft 50. The locking of shaft 50 permits a tarry at the end of the feed movement of the grinding wheel for spark out if desired. If a tarry is not desired at the end of each grind, switch 80 is closed to maintain solenoid 77 continuously energized and to thereby keep pawl 72 continuously disengaged from locking plate 70.

Immediately after the release of shaft 50 for resumed rotation, the leading edge 60a of disc 60 passes probe 61 to operate that probe. The probe 61 controls three pair of contacts, two normally open pair of contacts 61a and 61b which close at this time and one pair of normally closed contacts 61c which open at this time. A rectifier circuit RC connected between the lines L1 and L2 connected to source S produces a D.C. voltage across lines L3, L4. Since rotation of shaft 50 from the angular position in which notch 71 of plate 70 is opposite pawl 72 initiates retraction of the grinding wheel from the workpiece, the workpiece loader can be started at this time and the closing of contacts 61b are utilized for this purpose. As contacts 61a close, clutch 49, connected in series therewith across lines L3, L4, is energized. As contacts 61c open, clutch 57, connected in series therewith across lines L3, L4, is deenergized, and shaft 50 is driven through clutch 49 at a rapid speed.

The angularly adjustable probe 62 controls two pair of switch contacts, normally open contacts 62a (which are connected in series with contacts 61c and clutch 57 across lines L3, L4) and normally closed contacts 62b (which are connected in series with contacts 61c and clutch 49 across lines L3, L4). After shaft 50 has rotated 180 degrees from the position where disc 60 first operated probe 61, disc 60 will pass out of registration with that probe and the probe will therefore be released. This will open contacts 61a and close contacts 61c. At this time probe 62 is unoperated so contacts 62a are open and contacts 62b are closed. Therefore, clutch 49 remains energized through contacts 61c and 62b.

As shaft 50 continues to rotate, the leading edge 60a will come into registration with probe 62 when the central axis B of spindle 16 aproaches the position B3 (see FIG. 5). Operation of probe 62 will open contacts 62b (dropping out clutch 49) and will close contacts 62a (energizing clutch 57). Thus shaft 50 is driven at a slower, feed speed through clutch 57.

Thus, as the grinding wheel engages the workpiece 13, the grinding wheel is moving along an arc, indicated at 33a, of orbital path 33 at a constant angular velocity determined by change gears 52, 53. It will be noted from FIG. 5 that the direction of movement of the central axis B of spindle 16 is tangential to arc 33 and continuously changes as axis B moves along arc 33a. Thus the rate of penetration of the grinding wheel into the workpiece, which depends on the direction of movement of the grinding wheel relative to the workpiece, diminishes as the grind proceeds and reaches zero when the axis B of the grinding wheel reaches the point B1. A feed rate which slows down during the grind is desirable because a finer finish can be produced with a final slow grinding speed and because distortion is minimized when the grinding speed, and hence the grinding force diminishes at the end of the grind. For these reasons, it will frequently be unnecessary to have a tarry for spark out at the end of the grind.

Thus applicant has provided a grinding machine in which small precise feed movements of a wheelhead can be effected, without stick-slip, in rapid succession. For example, in a machine constructed in accordance with the present invention the eccentricity $e$ was .012 inch so that the wheelhead at the shaft 19 orbited through a circle of .024 inch diameter. Moreover, since spindle 16 is spaced from shaft 19, precise adjustment of the zone of movement of spindle 16, and hence the zone of movement of grinding wheel 15, is effected by rotation of the disc 30 which is engaged with roller 29.

What is claimed is:

1. In a grinding machine having a base and having means to support and rotate a workpiece in a grinding position,
    (a) a support shaft rotatably mounted in the base and having an eccentric portion thereon,
    (b) a wheelhead mounted on the eccentric portion of the support shaft for orbital movement as the support shaft is rotated,
    (c) a grinding wheel rotatably mounted in the wheelhead for orbital movement towards and away from a workpiece in the grinding position as the wheelhead orbits,
    (d) and means to rotate the support shaft at varying speeds to vary the rate of movement of the grinding wheel relative to a workpiece in the grinding position.

2. In a grinding machine having a base and having means to support and rotate a workpiece in a grinding position,
    (a) a support shaft rotatably mounted in the base and having an eccentric portion thereon, said eccentric portion of the shaft orbiting around a circular path of each rotation of the shaft,
    (b) a wheelhead mounted on the eccentric portion of the support shaft for orbital movement therewith,
    (c) a grinding wheel rotatably mounted in the wheelhead for approach toward, grinding of, and retraction from a workpiece in the grinding position on each orbit of the wheelhead,
    (d) means to rotate the support shaft,
    (e) and means coordinated with the orbital movement of the wheelhead to slow the rotation of the support shaft for grinding.

3. In a grinding machine having a base and having means to support and rotate a workpiece in a grinding position,
    (a) a support shaft rotatably mounted in the base and having an eccentric portion thereon,
    (b) a wheelhead mounted on the eccentric portion of the support shaft for orbital movement around a path on each rotation of the support shaft,
    (c) a grinding wheel rotatably mounted in the wheelhead for advance into and retraction from a workpiece in the grinding position on each orbit of the wheelhead, (d) signaling means operable in coordination with rotation of said support shaft to produce signals at predetermined angular positions of the support shaft, (e) a drive motor, (f) and a transmission connected between the drive motor and shaft for rotation thereof, said transmission operable in response to said signals to change the speed of the shaft during each rotation thereof.

4. In a grinding machine having a base and having means to support and rotate a workpiece in a grinding position, (a) a support shaft rotatably mounted in the base and having an eccentric portion thereon, (b) a wheelhead mounted on the eccentric portion of the support shaft for movement through a predetermined orbit on each rotation of the shaft, (c) a grinding wheel rotatably mounted in the wheelhead spaced from the support shaft, said grinding wheel moving into and away from the workpiece in the grinding position through a predetermined zone on each orbit of the wheelhead, (d) means to change the speed of rotation of said shaft during each rotation thereof to slow movement of the grinding wheel toward the workpiece as the grinding wheel approaches the workpiece, (e) and means to tilt the wheelhead on the support shaft to shift the orbit of the wheel head for adjustment of the zone of movement of the grinding wheel.

References Cited by the Examiner

UNITED STATES PATENTS

| | | | |
|---|---|---|---|
| 1,373,193 | 3/1921 | Lumsden. | |
| 2,003,883 | 6/1935 | Grundstein | 51—165 |
| 2,010,361 | 8/1935 | Harrison. | |
| 2,108,310 | 2/1938 | Griffing | 51—165 |
| 2,130,021 | 9/1938 | Neugart | 51—165 |
| 2,175,057 | 10/1939 | Kearns | 51—165 |
| 2,379,961 | 7/1945 | Heckethorn et al. | 51—103 X |
| 2,912,798 | 11/1959 | Seidel et al. | 51—103 |
| 3,209,494 | 10/1965 | Seidel | 51—103 |

LESTER M. SWINGLE, *Primary Examiner.*